United States Patent
Meguriya et al.

(10) Patent No.: US 10,203,639 B2
(45) Date of Patent: Feb. 12, 2019

(54) SILICONE RUBBER COMPOSITION FOR HIGHLY HEAT CONDUCTIVE THERMAL FIXING ROLL OR THERMAL FIXING BELT, FIXING ROLL, AND FIXING BELT

(75) Inventors: Noriyuki Meguriya, Annaka (JP);
Satao Hirabayashi, Annaka (JP);
Nobumasa Tomizawa, Annaka (JP);
Hiroki Furukawa, Nagano (JP);
Masao Matuhira, Nagano (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 647 days.

(21) Appl. No.: 12/829,537

(22) Filed: Jul. 2, 2010

(65) Prior Publication Data

US 2011/0003089 A1  Jan. 6, 2011

(30) Foreign Application Priority Data

Jul. 3, 2009 (JP) ................................. 2009-158809

(51) Int. Cl.
*C09D 183/04* (2006.01)
*G03G 15/20* (2006.01)

(52) U.S. Cl.
CPC . *G03G 15/2057* (2013.01); *G03G 2215/2016* (2013.01); *Y10T 428/10* (2015.01)

(58) Field of Classification Search
None
See application file for complete search history.

(56) References Cited

U.S. PATENT DOCUMENTS

| 4,444,944 | A | | 4/1984 | Matsushita |
| 5,064,807 | A | * | 11/1991 | Yoshida et al. ............... 503/227 |
| 5,354,536 | A | * | 10/1994 | Ezis ..................... C04B 35/575 |
| | | | | 419/10 |
| 5,441,799 | A | * | 8/1995 | Owens et al. ............. 428/312.6 |
| 6,165,612 | A | * | 12/2000 | Misra ............................ 428/344 |
| 6,174,841 | B1 | * | 1/2001 | Yamada ............... C10M 111/04 |
| | | | | 257/713 |
| 6,280,496 | B1 | * | 8/2001 | Kawai et al. ................... 75/236 |
| 7,166,363 | B2 | | 1/2007 | Meguriya et al. |
| 2005/0048296 | A1 | * | 3/2005 | Meguriya et al. ............. 428/447 |
| 2007/0135555 | A1 | * | 6/2007 | Hirabayashi et al. ........ 524/492 |

FOREIGN PATENT DOCUMENTS

| EP | 0682084 | A2 | * | 11/1995 | ............ C08L 71/123 |
| JP | 58-219259 | A | | 12/1983 | |
| JP | 3-221982 | A | | 9/1991 | |
| JP | 10-39666 | A | | 2/1998 | |
| JP | 2003-208052 | A | | 7/2003 | |
| JP | 2003246682 | A | * | 9/2003 | |
| JP | 2005-70409 | A | | 3/2005 | |

OTHER PUBLICATIONS

English language machine translation of JP 2003246682 (2003).*

* cited by examiner

*Primary Examiner* — Kenneth J Stachel
(74) *Attorney, Agent, or Firm* — Birch, Stewart, Kolasch & Birch, LLP

(57) ABSTRACT

A thermal fixing roll or belt-forming silicone rubber composition having a high thermal conductivity, a low compression set, and an improved heat resistance which is well adapted for use as a coating material in a fixing roll or fixing belt is provided. Also provided are a fixing roll and a fixing belt formed by using such composition. The thermal fixing roll or belt-forming silicone rubber composition comprises 100 parts by weight of a heat-curable silicone rubber composition and 50 to 800 parts by weight of silicon carbide having an iron content of up to 0.2% by weight at the surface and an average particle size of 1 to 50 μm.

12 Claims, No Drawings

SILICONE RUBBER COMPOSITION FOR HIGHLY HEAT CONDUCTIVE THERMAL FIXING ROLL OR THERMAL FIXING BELT, FIXING ROLL, AND FIXING BELT

CROSS-REFERENCE TO RELATED APPLICATION

This non-provisional application claims priority under 35 U.S.C. § 119(a) on Patent Application No. 2009-158809 filed in Japan on Jul. 3, 2009, the entire contents of which are hereby incorporated by reference.

TECHNICAL FIELD

This invention relates to a highly heat conductive silicone rubber composition as well as a highly heat conductive thermal fixing roll and a highly heat conductive thermal fixing belt prepared by using the composition. More specifically, this invention relates to a highly heat conductive silicone rubber composition exhibiting low compression set simultaneously with a high thermal conductivity, and which is well adapted for use as a coating material of a fixing roll such as heat roll and pressure roll and a fixing belt in copier machines and laser beam printers. This invention also relates to a highly heat conductive thermal fixing roll and a highly heat conductive thermal fixing belt prepared by using such composition.

BACKGROUND ART

Silicone rubbers are excellent in electric insulation, heat resistance, weatherability, and flame retardancy, and they have been used as a coating material on a fixing roll including heat roll and pressure roll in a copier machine or laser beam printer. With the increase in the speed of the copying and popularization of color copying, the fixing roll is required to have lower hardness. Nowadays, rolls prepared from a highly heat conductive silicone rubber coated with a fluororesin are often used in replacement of the conventional metal or fluororesin rolls which failed to cope with the high speed and the color copying. More specifically, the rubber used for the heat roll is required to have a high thermal conductivity to reduce the warm-up time and also, to save the energy required for the machine operation. This roll should also have low compression set since the roll is constantly exposed to a high temperature of 150 to 230° C.

In the meanwhile, the thickness of the rubber layer has also been reduced to thereby reduce the warm-up time required for the temperature increase as well as the printer size. Under such situation, in addition to the conventional rolls prepared by forming a rubber layer on the mandrel, fixing belts comprising an endless belt made of a thin sheet of a metal or a heat resistant resin having formed thereon a rubber layer and a release layer has also be used.

However, the silicone rubber does not have a high thermal conductivity, and a filler having a high thermal conductivity has been added to the silicone rubber to fulfill such requirement. Exemplary silicone rubbers include those disclosed in JP-A S58-219259, JP-A H03-221982, and JP-A H10-39666. The silicone rubbers are those prepared by adding a thermally conductive filler such as silica, alumina, or magnesium oxide to the conventional silicone rubber. These fillers, however, have been associated with the problem of the silicone rubber deterioration when the filler content is increased or the product is used at a high temperature. As an alternative filler, JP-A 2003-208052 discloses the use of silicon carbide for the thermal conductivity filler. However, the use of silicon carbide had the problem that the compression set of the resulting product varied so much depending on the particle size and the treating method.

Accordingly, there is a demand for the development of a silicone rubber composition having a highly thermal conductivity which can be formed into a silicone rubber exhibiting high thermal conductivity simultaneously with the low compression set, and which also experiences reduced change of physical properties under high temperature conditions.

DISCLOSURE OF INVENTION

The present invention has been completed in view of the situation as described above, and an object of the present invention is to provide a highly heat conductive silicone rubber composition which exhibits a highly thermal conductivity simultaneously with the low compression set and the improved heat resistance, and which is well adapted for use as a coating material in a fixing roll or fixing belt. Another object of the present invention is to provide a highly heat conductive thermal fixing roll and a highly heat conductive thermal fixing belt formed by using the composition.

In order to realize such objects, the inventors of the present invention made an intensive study on the materials which has highly thermal conductivity and low compression set, and which also has an improved heat resistance. The inventors then found that a highly heat conductive silicone rubber composition which has a high thermal conductivity, a low compression set, and an improved heat resistance, and which is well adapted for use as a coating material of a fixing roll can be produced if silicon carbide having an average particle size of 1 to 50 μm and an iron content of 0.2% ("%" designates "% by weight" and this also applies for the following description) at the surface of the silicon carbide is incorporated in a heat-curable silicone rubber composition. The inventors also found that a highly heat conductive thermal fixing roll or a highly heat conductive thermal fixing belt can be produced with high quality if the highly heat conductive silicone rubber composition is used for the formation of the silicone rubber layer of the fixing roll or the fixing belt. The present invention has been completed on the bases of such findings.

It is to be noted that JP-A 2005-70409 discloses the use of a mixture of powder slurries each having different pH, and silicon carbide is mentioned as an example of the powder. However, this document does not include any embodiment actually using the silicon carbide not to mention the reference to the iron content at the surface. This document is also silent on the pH of the slurry.

Accordingly, this invention provides a silicone rubber composition for a highly heat conductive thermal fixing roll or a highly heat conductive thermal fixing belt as described below. This invention also provides a fixing roll and a fixing belt as described below.

[1] A silicone rubber composition for forming a highly heat conductive thermal fixing roll or a highly heat conductive thermal fixing belt comprising
  100 parts by weight of a heat-curable silicone rubber composition and
  50 to 800 parts by weight of silicon carbide having an iron content of up to 0.2% by weight at the surface of the silicon carbide and an average particle size of 1 to 50 μm.
[2] The thermal fixing roll or belt-forming silicone rubber composition according to [1] wherein the silicon carbide is the one prepared by washing pulverized silicon carbide with an aqueous acid solution.

[3] The thermal fixing roll or belt-forming silicone rubber composition according to [2] wherein the acid of the aqueous acid solution is the one selected from hydrochloric acid, sulfuric acid, nitric acid, and hydrofluoric acid.

[4] The thermal fixing roll or belt-forming silicone rubber composition according to any one of [1] to [3] wherein the silicon carbide is a mixture of particles having an average particle size of at least 5 μm and particles having an average particle size of less than 5 μm at a weight ratio of 99/1 to 50/50.

[5] The thermal fixing roll or belt-forming silicone rubber composition according to any one of [1] to [4] further comprising
iron oxide having an average particle size of 0.01 to 0.5 μm in an amount of 0.1 to 20 parts by weight per 100 parts by weight of the heat-curable silicone rubber composition.

[6] The thermal fixing roll or belt-forming silicone rubber composition according to any one of [1] to [5] wherein the cured rubber has a thermal conductivity of at least 0.5 W/m·° C.

[7] The thermal fixing roll or belt-forming silicone rubber composition according to any one of [1] to [6] wherein the heat-curable silicone rubber composition is an addition curable silicone rubber composition or an organic peroxide curable silicone rubber composition.

[8] The thermal fixing roll or belt-forming silicone rubber composition according to [7] wherein the addition curable silicone rubber composition consists of:
(A) 100 parts by weight of an organopolysiloxane having at least two alkenyl groups bonded to the silicon atoms in one molecule,
(B) an organohydrogenpolysiloxane having at least two hydrogen atoms bonded to the silicon atoms in one molecule at an amount such that the molar ratio of the hydrogen atoms bonded to the silicon atoms to the alkenyl groups in the component (A) is in the range of 0.4 to 5, and
(C) a catalytic amount of an addition catalyst.

[9] A fixing roll comprising a mandrel and a silicone rubber layer on the outer surface of the mandrel wherein the silicone rubber layer is a cured product of the thermal fixing roll or belt-forming silicone rubber composition of any one of [1] to [8].

[10] A fluororesin-coated fixing roll comprising a mandrel, a silicone rubber layer on the outer surface of the mandrel, and a fluororesin layer on the silicone rubber layer, wherein the silicone rubber layer is a cured product of the thermal fixing roll or belt-forming silicone rubber composition of any one of [1] to [8].

[11] A fixing belt comprising a substrate comprising a heat resistant resin or a metal and a silicone rubber layers on front and back surfaces of the substrate, wherein the silicone rubber layers are a cured product of the thermal fixing roll or belt-forming silicone rubber composition of any one of [1] to [8].

[12] A fluororesin coated fixing belt comprising a substrate comprising a heat resistant resin or a metal, silicone rubber layers on front and back surfaces of the substrate, and fluororesin layers on the silicone rubber layers, wherein the silicone rubber layer is a cured product of the thermal fixing roll or belt-forming silicone rubber composition of any one of [1] to [8].

Advantageous Effects of Invention

The highly thermal conductive silicone rubber composition for forming a thermal fixing roll or belt of the present invention is capable of producing a silicone rubber which exhibits low compression set despite its high thermal conductivity, which experiences reduced change in the physical properties under high temperature conditions, and which is well adapted for use as a coating material of fixing rolls and fixing belts. The highly heat conductive thermal fixing roll and the highly heat conductive thermal fixing belt having the silicone rubber layer formed from the highly thermal conductive silicone rubber composition of the present invention are quite useful for use as a fixing roll such as heat roll and pressure roll as well as a fixing belt of a copier machine or a laser beam printer.

DESCRIPTION OF EMBODIMENTS

The thermal fixing roll or belt-forming silicone rubber composition (the highly heat conductive silicone rubber composition) of the present invention is a composition prepared by blending a heat-curable silicone rubber composition blended with silicon carbide having a particular range of iron content at the surface and average particle size.

The heat-curable silicone rubber composition is preferably an addition curable silicone rubber composition or an organic peroxide curable silicone rubber composition. The addition curable silicone rubber composition is more preferred.

The addition curable silicone rubber composition consists of
(A) 100 parts by weight of an organopolysiloxane having at least two alkenyl groups bonded to the silicon atoms in one molecule,
(B) an organohydrogenpolysiloxane having at least two hydrogen atoms bonded to the silicon atoms (i.e., SiH groups) in one molecule at an amount such that the molar ratio of the hydrogen atoms directly bonded to the silicon atoms to the alkenyl groups in the component (A) is in the range of 0.4 to 5, and
(C) a catalytic amount of an addition catalyst.

The organopolysiloxane of the component (A) is an organopolysiloxane having at least two alkenyl groups bonded to the silicon atoms in one molecule, and which is liquid or raw rubber-like state at room temperature (25° C.). The organopolysiloxane preferably has the following average compositional formula (1):

$$R^1_a SiO_{(4-a)/2} \qquad (1)$$

wherein $R^1$ is independently an unsubstituted or substituted monovalent hydrocarbon group having 1 to 10 carbon atoms, preferably 1 to 8 carbon atoms; and a is a positive number in the range of 1.5 to 2.2, preferably 1.8 to 2.1, more preferably 1.95 to 2.05, and still more preferably 1.98 to 2.02.

In the formula (1), at least 2 (and typically 2 to about 50), preferably 2 to about 20 of $R^1$ is an alkenyl group preferably having 2 to 8 carbon atoms, more preferably 2 to 6 carbon atoms.

In this case, exemplary alkenyl groups include vinyl group, allyl group, propenyl group, isopropenyl group, butenyl group, hexenyl group, cyclohexenyl group, and octenyl group, and the most preferred is vinyl group.

The content of the alkenyl group in the organopolysiloxane is preferably $1.0 \times 10^{-6}$ to $5.0 \times 10^{-3}$ mol/g, and more preferably $5.0 \times 10^{-6}$ to $1.0 \times 10^{-3}$ mol/g. When the content of the alkenyl group is less than $1.0 \times 10^{-6}$ mol/g, the composition may become a gel due to the insufficient crosslinking whereas the content in excess of $5.0 \times 10^{-3}$ mol/g may lead to excessive crosslinking density to result in the brittle rubber.

The alkenyl group may be bonded to the silicon atom either at the end of the molecular chain, in the midst of the molecular chain, or both. The organopolysiloxane used in the present invention is preferably the one containing the alkenyl group bonded to the silicon atom at the end of the molecular chain in view of the curing speed of the composition and the physical properties of the composition.

Exemplary unsubstituted or substituted monovalent hydrocarbon groups having 1 to 10 carbon atoms represented by $R^1$ other than the alkenyl group include alkyl groups such as methyl group, ethyl group, propyl group, isopropyl group, butyl group, isobutyl group, tert-butyl group, pentyl group, neopentyl group, hexyl group, cyclohexyl group, octyl group, nonyl group, and decyl group, aryl groups such as phenyl group, tolyl group, xylyl group, and naphthyl group, aralkyl groups such as benzyl group, phenylethyl group, and phenylpropyl group, and groups in which one or more of the hydrogen atoms in any of the above-mentioned groups are substituted with a halogen atom such as fluorine, bromine or chlorine, or cyano group, for example, chloromethyl group, chloropropyl group, bromoethyl group, trifluoropropyl group, and cyanoethyl group. Preferably, at least 90% by mole, and more preferably all of the groups represented by $R^1$ other than the alkenyl group are methyl group.

The organopolysiloxane typically has a basically straight chain structure wherein the backbone comprises recurring diorganosiloxane units (($R^1$)$_2$SiO$_{2/2}$ units), and both ends of the backbone are capped with a triorganosiloxy group (($R^1$)$_3$SiO$_{1/2}$ unit). It may partially have a branched or cyclic structure containing $R^1$SiO$_{3/2}$ unit or SiO$_{4/2}$ unit. $R^1$ is as defined above.

The alkenyl group-containing organopolysiloxane of the component (A) may have a degree of polymerization (or number of silicon atoms in the molecule) of at least about 100 (typically 100 to 100,000), preferably about 150 to 50,000, and more preferably about 200 to 20,000. The degree of polymerization may be determined as the number average molecular weight calculated in terms of polystyrene determined by, gel permeation chromatography (GPC) (and this also applies to the following description).

Examples of the component (A) include compounds represented by the following general formulae:

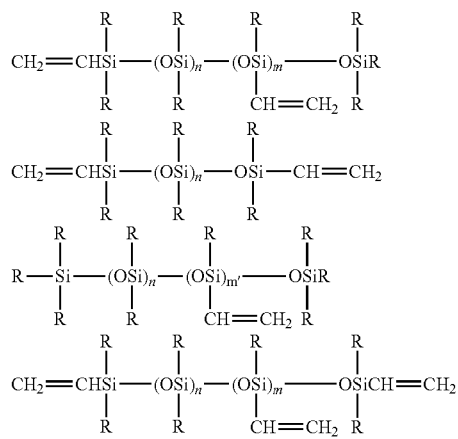

In the general formulae as described above, R is independently an unsubstituted or substituted monovalent hydrocarbon group having 1 to 10 carbon atoms excluding the alkenyl group. Examples of R include those as described above for the $R^1$ other than the alkenyl group. m, m', and n are respectively an integer of m≥1, m'≥2, and n≥0, and [m(m')+n] is a number which results in the degree of polymerization of the organopolysiloxane as described above.

The organohydrogenpolysiloxane of the component (B) has at least two hydrogen atoms bonded to the silicon atoms (i.e., Si—H groups) in one molecule, and it is preferably the one which is liquid with the viscosity of up to 1,000 mPa·s, typically 0.5 to 1,000 mPa·s, and in particular, 1 to 500 mPa·s at 25° C. This organohydrogenpolysiloxane acts as a curing agent, and more specifically, it promotes curing of the composition by crosslinking through addition by hydrosilylation between the Si—H groups in the organohydrogenpolysiloxane and the alkenyl groups bonded to the silicon atoms in the organopolysiloxane of the component (A). In the present invention, the viscosity is the value measured by a rotary viscometer (and this also applies to the following description).

The organohydrogenpolysiloxane of the component (B) preferably has the following average compositional formula (2):

  (2)

wherein $R^2$ is independently an unsubstituted or substituted monovalent hydrocarbon group having 1 to 10, preferably 1 to 8 carbon atoms, b and c are respectively positive number such that b is 0.7 to 2.1, preferably 0.8 to 2.0, c is 0.001 to 1.0, preferably 0.01 to 1.0, and b+c is 0.8 to 3.0, preferably 1.0 to 2.5; and which has at least 2, typically 2 to about 300, preferably at least 3 (for example, 3 to about 150), and more preferably 4 to about 100 hydrogen atoms bonded to the silicon atoms (or Si—H groups) in one molecule.

Examples of the monovalent hydrocarbon group $R^2$ include those as mentioned above for the $R^1$ in the average compositional formula (1). The monovalent hydrocarbon group $R^2$, however, is preferably the one containing no unsaturated aliphatic group. The organohydrogenpolysiloxane is not limited for its molecular structure and it may have a straight chain, cyclic, branched, or three dimensional network structure. The organohydrogenpolysiloxane is preferably liquid at room temperature (25° C.) with the number of the silicon atoms in one molecule (or the degree of polymerization) of typically 2 to about 300, preferably 3 to about 150, and more preferably 4 to about 100. The hydrogen atom bonded to the silicon atom may be located either at the terminal or in the midst of the molecular chain, or at both.

Exemplary organohydrogenpolysiloxanes include
1,1,3,3-tetramethyldisiloxane,
1,3,5,7-tetramethylcyclotetrasiloxane,
methylhydrogencyclopolysiloxane,
methylhydrogensiloxane-dimethylsiloxane cyclic copolymer,
tris(dimethylhydrogensiloxy)methylsilane,
tris(dimethylhydrogensiloxy)phenylsilane,
methylhydrogenpolysiloxane capped with trimethylsiloxy group at both ends,
dimethylsiloxane-methylhydrogensiloxane copolymer capped with trimethylsiloxy group at both ends,
dimethylpolysiloxane capped with dimethylhydrogensiloxy group at both ends,
methylhydrogenpolysiloxane capped with dimethylhydrogensiloxy group at both ends,
dimethylsiloxane-methylhydrogensiloxane copolymer capped with dimethylhydrogensiloxy group at both ends, methylhydrogensiloxane-diphenylsiloxane copolymer capped with trimethylsiloxy group at both ends,
methylhydrogensiloxane-diphenylsiloxane copolymer capped with dimethylhydrogensiloxy group at both ends,
methylhydrogensiloxane-diphenylsiloxane-dimethylsiloxane copolymer capped with trimethylsiloxy group at both ends,
methylhydrogensiloxane-diphenylsiloxane-dimethylsiloxane copolymer capped with dimethylhydrogensiloxy group at both ends,
a copolymer consisting of $(CH_3)_2HSiO_{1/2}$ unit and $SiO_{4/2}$ unit,
a copolymer consisting of $(CH_3)_2HSiO_{1/2}$ unit and $SiO_{4/2}$ unit and
$(C_6H_5)SiO_{3/2}$ unit, and
the compound as described above in which a part or all of the methyl group has been substituted with other alkyl group or the like.

The organohydrogenpolysiloxane of the component (B) may be incorporated at an amount such that the molar ratio of the hydrogen atom bonded to the silicon atom to the alkenyl group in the component (A) is in the range of 0.4 to 5, and preferably 0.5 to 2.5. When the molar ratio is less than 0.4, crosslinking density of the silicone rubber will be excessively low to detract from the heat resistance. On the other hand, the molar ratio in excess of 5 may lead to the undesirable foaming by dehydrogenation, and such molar ratio may also adversely affect the heat resistance. For the same reason, the organohydrogenpolysiloxane of the component (B) may be incorporated at an amount of typically 0.1 to 30 parts by weight, preferably 0.3 to 10 parts by weight in relation to 100 parts by weight of the component (A).

Examples of the addition catalyst of the component (C) include platinum group metal catalysts such as platinum catalysts (for example, platinum black, platinum (II) chloride, chloroplatinic acid, reaction product of chloroplatinic acid with a monovalent alcohol, a complex of chloroplatinic acid with an olefin, and platinum bisacetoacetate), palladium catalysts, and rhodium catalysts. The addition catalyst is preferably incorporated at a catalytic amount, namely, at an amount that is required for the curing of the composition which is typically 0.5 to about 1,000 ppm, and more preferably 1 to about 500 ppm in terms of the weight of the platinum group metal in relation to the total amount of the component (A) and the component (B).

The organic peroxide curable silicone rubber composition consists of
(D) 100 parts by weight of an organopolysiloxane having at least two alkenyl groups bonded to the silicon atom in one molecule, and
(E) a catalytic amount of an organic peroxide.

The organopolysiloxane of the component (D) is represented by the following average compositional formula (3):

$$R^3_d SiO_{(4-d)/2} \qquad (3)$$

wherein $R^3$ is independently an unsubstituted or substituted monovalent hydrocarbon group, and d is a positive number of 1.98 to 2.02, and preferably 1.99 to 2.005.

In this formula, $R^3$ may be an unsubstituted or substituted monovalent hydrocarbon group having 1 to 12, preferably 1 to 8 carbon atoms. Examples of $R^3$ include alkyl groups such as methyl group, ethyl group, propyl group, and butyl group, cycloalkyl groups such as cyclohexyl group, alkenyl groups such as vinyl group, allyl group, butenyl group, and hexenyl group, aryl groups such as phenyl group and tolyl group, aralkyl groups such as β-phenylpropyl group, and groups in which one or more of the hydrogen atoms bonded to the carbon atom of such group are substituted with a halogen atom such as fluorine, bromine or chlorine, or cyano group, for example, chloromethyl group, trifluoro propyl group, and cyanoethyl group. Preferably, at least 90% by mole, and more preferably all of the groups represented by $R^3$ other than the alkenyl group as described below are methyl group.

Letter d is a positive number in the range of 1.98 to 2.02, preferably 1.99 to 2.005, and the organopolysiloxane may be the one endcapped with trimethylsilyl group, dimethylvinylsilyl group, dimethyl hydroxy silyl group, trivinylsilyl group, or the like. In the present invention, the organopolysiloxane should have at least 2, typically 2 to 50, preferably 2 to about 20 alkenyl groups per molecule, and 0.001 to 10% by mole, preferably 0.01 to 5% by mole of $R^3$ is an alkenyl group, and in particular, vinyl group. The alkenyl group may be bonded to the silicon atom either at the end of the molecular chain, in the midst of the molecular chain, or both.

The organopolysiloxane typically has a basically straight chain structure wherein the backbone comprises recurring diorganosiloxane units ($(R^3)_2SiO_{2/2}$ units and both ends of the backbone are capped with a triorganosiloxy group ($(R^3)_3SiO_{1/2}$ unit). It may partially have branched or cyclic structure containing $R^1SiO_{3/2}$ unit or $SiO_{4/2}$ unit. $R^3$ is as defined above.

The organopolysiloxane of the component (D) is not particularly limited for its molecular weight, and the organopolysiloxane used may be a liquid organopolysiloxane with low viscosity or a raw rubber-like organopolysiloxane having a high viscosity (an organopolysiloxane which is not liquid and which is not self-flowable at room temperature). The alkenyl group-containing organopolysiloxane of the component (D) may have a degree of polymerization (or number of silicon atoms in the molecule) of at least about 100, typically 100 to 100,000, preferably about 150 to 50,000, and more preferably about 200 to 20,000 so that the organopolysiloxane becomes a rubber elastomer after curing.

The organic peroxide of the component (E) is not particularly limited and any known organic peroxide may be used as long as it can be used as a catalyst for promoting the crosslinking of the component (D). Exemplary organic peroxides include chlorine-free organic peroxides such as acyl organic peroxides (for example, benzoyl peroxide, p-methylbenzoyl peroxide, and o-methylbenzoyl peroxide) and non-acyl organic peroxides (for example, 2,5-dimethyl-2,5-di-t-butylperoxy hexane, t-butylperoxy benzoate, dicumyl peroxide, and cumyl-t-butyl peroxide). More specifically, the preferred are acyl organic peroxides such as benzoyl peroxide, p-methylbenzoyl peroxide, and o-methylbenzoyl peroxide for normal pressure hot air vulcanization. The organic peroxide as mentioned above may be used either alone or in combination of two or more.

The organic peroxide may be incorporated at a catalytic amount which may be selected according to the curing speed of the composition. Typically, the organic peroxide is incorporated at 0.1 to 10 parts by weight, more preferably at 0.3 to 5 parts by weight per 100 parts by weight of the organopolysiloxane of the component (D). When incorporated at less than 0.1 parts by weight, the crosslinking is insufficient in some cases whereas incorporation in excess of 10 parts by weight is economically disadvantageous since the curing speed is no longer improved.

In the present invention, silicon carbide is incorporated in the heat-curable silicone rubber composition as described above to prepare the thermal fixing roll or belt-forming composition (i.e., the highly thermal conductive silicone rubber). The silicon carbide is a fine powder component added for improving the thermal conductivity of the silicone rubber obtained after curing the composition of the present invention. The silicon carbide is not limited for its shape, and it may have a spherical, as-pulverized, or irregular shape while the average particle size of the silicon carbide is typically in the range of 1 to 50 preferably 2 to 30 μm, and more preferably 3 to 20 μm. When the average particle size is less than 1 μm, incorporation of a large amount of the silicon carbide required for improving the thermal conductivity becomes difficult while the average particle size in excess of 50 μm may adversely affect the physical properties of the rubber.

In the present invention, the silicon carbide used may comprise a single type of silicon carbide having a particular average particle size or a blend of two or more types of silicon carbide each having different average particle size. When blended, the mixture of the particles having an average particle size of at least 5 μm and the particles having an average particle size of less than 5 μm is preferable since such blend can be incorporated in the composition at an increased content with no adverse effects on the moldability of the composition. In such a case, the particles may be blended at a ratio (weight ratio) of [the particles of having an average particle size of at least 5 μm]/[the particles of having an average particle size of less than 5 μm] of 99/1 to 50/50, more preferably 95/5 to 70/30, and most preferably 90/10 to 75/25. Three or more types of silicon carbide each having different particle size may also be blended, and in such a case, at least one type of the particles in the three or more types preferably has an average particle size of at least 5 μm, and at least one other type preferably has an average particle size of less than 5 μm.

The average particle size may be determined in terms of cumulative weight average particle size (D50) (or median diameter) by using a particle size distribution meter using laser diffractometry analysis (This also applies to the following description).

In the present invention, it is also important that the content of the iron near the surface of the silicon carbide fine powder is up to 0.2% by weight (that is, 0 to 0.2% by weight), preferably up to 0.15% by weight (0 to 0.15% by weight), and more preferably up to 0.1% by weight (0 to 0.1% by weight) in relation to the entire silicon carbide fine powder. When the iron content at the surface is in excess of 0.2% by weight, the silicone rubber composition having such silicon carbide incorporated therein will exhibit reduced compression set. It is to be noted that the iron content may be 0% at the surface. The method used for measuring the iron content at the surface is described in "Method for measuring surface iron content" in JIS R6124 "Method for chemical analysis of silicon carbide abrasives".

The silicon carbide having such low surface iron content may be prepared by pulverizing the silicon carbide to produce a silicon carbide fine powder and washing the powder in aqueous solution of an inorganic acid such as hydrochloric acid, sulfuric acid, nitric acid, hydrofluoric acid.

The silicon carbide used may also be the one having its surface treated with an organosilicon compound such as organoalkoxysilane, organosilazane, silanol, or alkoxy group-containing organopolysiloxane. The surface treated silicon carbide may be the one which had been preliminarily surface treated, or alternatively, the surface treatment of the silicon carbide may be conducted by simultaneously adding the surface treating agent as described above in the course of blending the silicon carbide with the component (A).

In the present invention, the silicon carbide may be incorporated at an amount of 50 to 800 parts by weight, more preferably 100 to 600 parts by weight in relation to 100 parts by weight of the heat-curable silicone rubber composition. When incorporated at less than 50 parts by weight, the resulting composition will not be provided with sufficient thermal conductivity, whereas incorporation in excess of 800 parts by weight results not only in the marked deterioration in the physical properties of the rubber but also in the difficulty of blending.

Preferably, the thermal fixing roll or belt-forming silicone rubber composition of the present invention also comprises iron oxide having a particular average particle size. Incorporation of the iron oxide improves heat resistance of the silicone rubber obtained after curing the composition of the present invention. More specifically, when the iron oxide having a particular average particle size is used with the silicon carbide in the present invention, decrease of the heat resistance as a result of the addition of the silicon carbide can be suppressed, and durability of the adhesion between the silicone rubber and the fluororesin layer can be improved when the highly heat conductive silicone rubber composition is used for the fixing roll or a fixing belt coated with a fluororesin.

Iron oxide preferably has an average particle size of 0.01 to 0.5 μm, preferably 0.02 to 0.3 μm, and more preferably 0.05 to 0.2 μm. The use of the iron oxide having an average particle size of less than 0.01 μm may invite difficulty of blending and dispersion, while iron oxide in excess of 0.5 μm may result in the failure of realizing the sufficient heat resistance.

The iron oxide may be either ferrous oxide or ferric oxide, or an oxide containing the both. The ion oxide used may also be the one having its surface treated with an organosilicon compound such as organoalkoxysilane, organosilazane, silanol, or alkoxy group-containing organopolysiloxane. The surface treated iron oxide may be the one which had been preliminarily surface treated, or alternatively, the surface treatment of the iron oxide may be conducted by simultaneously adding the surface treating agent as described above in the course of blending the iron oxide with the component (A).

The iron oxide is an optional component which is incorporated as desired. When incorporated, it may be used at an amount in the range of 0.1 to 20 parts by weight, and preferably at 0.5 to 15 parts by weight in relation to 100 parts by weight of the heat-curable silicone rubber composition. Incorporation of the iron oxide at less than 0.1 parts by weight may be insufficient for improving the heat resistance whereas incorporation in excess of 20 parts by weight may result in the loss of flowability of the rubber composition as well as insufficient physical properties of the cured rubber.

The inorganic powder components such as silicon carbide and iron oxide may be incorporated in the heat-curable silicone rubber composition by using apparatus such as planetary mixer or kneader at room temperature. The blending may be effected either at room temperature or under heated environment, and the components may be blended at a high temperature of 100 to 200° C. before the addition of the organohydrogenpolysiloxane of component (B) and the curing catalyst of the component (C) or (E).

In addition to the silicon carbide, the thermal fixing roll or belt-forming silicone rubber composition of the present invention may have components other than the silicon carbide added for the purpose of improving the thermal conductivity. Exemplary such components include pulverized quartz, alumina, and zinc oxide. These additional thermal conductivity-imparting components may be added at an amount of up to 500 parts by weight (0 to 500 parts by weight), and preferably 20 to about 300 parts by weight in relation to 100 parts by weight of the heat-curable silicone rubber composition.

If desired, dry silica (fumed silica) may be incorporated for the prevention of the precipitation and for the reinforcement of the cured rubber. The dry silica is preferably the one in the form of particles having a specific surface area as determined by BET method of 50 to about 400 m$^2$/g, and preferably 100 to 350 m$^2$/g, and examples of hydrophilic silica and hydrophobic silica.

The dry silica may be blended at an amount in the range of up to 20 parts by weight (0 to 20 parts by weight), and preferably 0.5 to 15 parts by weight in relation to 100 parts by weight of the heat-curable silicone rubber composition. The incorporation at an amount in excess of 20 parts by weight may invite loss of the flowability of the rubber composition as well as loss of the compression set of the cured product. When the silica filler such as the wet silica as described below is incorporated, the total amount of the silica filler incorporated in the composition is preferably in the range of 1 to 50 parts by weight, more preferably 1 to 20 parts by weight in relation to 100 parts by weight of the heat-curable silicone rubber composition.

If desired, the thermal fixing roll or belt-forming silicone rubber composition may also contain a filler such as a silica filler including wet silica (precipitated silica) and diatomaceous earth, clay, calcium carbonate, titanium dioxide; heat resistance improving agent such as cerium oxide and cerium hydroxide; a carbon functional silane for improving adhesion and moldability; a nitrogen compound or a halogen compound for providing flame retardancy.

The thermal fixing roll or belt-forming silicone rubber composition of the present invention is used for the formation of a silicone rubber layer in a fixing roll having a silicone rubber layer on the exterior surface of a mandrel or a fixing belt having a silicone rubber layer on the major surfaces (the front and back surfaces) of the substrate such as an endless belt comprising a thin film of a heat resistant resin or a metal, and for the formation of a silicone rubber layer in a fluororesin-coated fixing roll or a fluororesin-coated fixing belt having a fluororesin layer of a fluororesin coating material or a fluororesin tube formed as a surface layer on the silicone rubber layer. The fixing roll and the fixing belt having the silicone rubber layer formed from the thermal fixing roll or belt-forming silicone rubber composition of the present invention has high thermal conductivity, low compression set, and high heat resistance, and therefore, is useful for use in a copier machine, laser beam printer, and the like.

In this case, the material and the size of the mandrel or the substrate of the fixing roll or the fixing belt may be adequately selected depending on the type of the roll or the belt. The silicone rubber layer in the fixing roll may preferably have a thickness of 0.1 to 5.0 mm, and more preferably 0.3 to 3.0 mm. A roll having the silicone rubber layer thinner than 0.1 mm may result in the insufficient elasticity of the roll, while the thickness in excess of 5.0 mm may result in the poor thermal conductivity.

On the other hand, the silicone rubber layer in the fixing belt may preferably have a thickness of 0.05 to 2.0 mm, and more preferably 0.1 to 1.0 mm. When the thickness is less than 0.05 mm, the formation of the silicone rubber layer having uniform thickness may be difficult, whereas the thickness in excess of 1.0 mm may result in poor thermal conductivity, and hence, in economical disadvantage.

The method used for the molding and curing of the thermal fixing roll or belt-forming silicone rubber composition may be adequately selected from those commonly used in the art. Molding may be conducted by encapsulation molding, transfer molding, injection molding, coating, and the like, and the composition may be cured by heating.

The conditions used for the curing of the thermal fixing roll or belt-forming silicone rubber composition of the present invention is not particularly limited. However, the silicone rubber composition is preferably cured at 120 to 200° C., and more preferably at 130 to 180° C. for 3 minutes to 1 hour, and post-cured at 180 to 220° C. for 1 to 12 hours.

In the present invention, the silicone rubber after curing preferably has a thermal conductivity of at least 0.5 W/m·° C. (for example, 0.5 to 5 W/m·° C.), and more preferably 0.6 to 3 W/m·° C. The thermal conductivity of less than 0.5 W/m·° C. may invite insufficient toner fixation.

The cured silicone rubber having the thermal conductivity of such range can be produced, for example, by curing a thermal fixing roll or belt-forming silicone rubber composition containing 100 to 500 parts by weight of the silicon carbide powder or the silicon carbide powder having a part thereof (for example, up to 50% by weight of the silicon carbide powder) substituted with at least one thermal conductivity filler selected from quartz powder, aluminum oxide, and zinc oxide per 100 parts by weight of the heat-curable silicone rubber composition.

The thermal conductivity of the silicone rubber may be measured, for example, by using a thermal conductivity meter QTM-3 (manufactured by Kyoto Electronics Manufacturing Co., Ltd.).

The fluororesin exterior layer formed on the exterior of the intervening silicone rubber layer may be formed by using a fluororesin coating material or a fluororesin tube. When the fluororesin coating material is used, a layer of the material such as polytetrafluoroethylene resin (PTFE) latex or DAI-EL latex (a fluorine latex manufactured by Daikin Industries LTD.) may be deposited on the exterior of the silicone rubber layer.

Exemplary fluororesin tubes used are commercially available tubes including those made of polytetrafluoroethylene resin (PTFE), tetrafluoroethylene-perfluoroalkyl vinyl ether copolymer resin (PFA), ethylene fluoride-propylene copolymer resin (FEP), polyvinylidene fluoride resin (PVDF), or polyvinyl fluoride resin. When a fixing roll is prepared by using a fluororesin tube, a silicone resin layer may be formed, for example, by introducing the silicone rubber composition of the present invention between the mandrel and the tube and curing the introduced silicone resin layer. The silicone resin layer of the present invention is most preferably formed by using a PFA tube.

The surface of the fluororesin coating material or the fluororesin tube layer that is brought in contact with the silicone rubber layer is preferably treated, for example, by corona discharge treatment, sodium naphthalene method, liquid ammonia method, sputter etching, or eximer laser treatment to thereby facilitate the contact with the silicone rubber. Adhesion durability can be further improved by treating the surface with a primer.

The fluororesin layer may be formed to an adequately selected thickness which is preferably in the range of 0.1 to 100 μm, and more preferably 1 to 50 μm. When the fluororesin layer is thinner than 0.1 μm, the fixing roll will have an insufficient hardness, and this may invite slippage of the paper supplied to the roll. On the other hand, the resulting fixing roll will be excessively hard when the thickness of the fluororesin layer is in excess of 100 μm, and in this case, a poor fixed image may be formed due to the insufficient nip space.

EXAMPLES

Next, the present invention is described in detail by referring to Examples and Comparative Examples, which by no means limit the scope of the present invention. In the following Examples, "part" is "part by weight" and "%" is "% by weight"; average particle diameter is cumulative weight average particle size (D50) determined by laser diffractometry; and the degree of polymerization is the number average molecular weight calculated in terms of polystyrene determined by gel permeation chromatography (GPC).

[Silicon Carbide]

Silicon carbide was pulverized to an average particle size of 10 μm, 4 μm, and 1 μm, respectively. After the pulverization, the silicon carbide was washed by the procedure as described below.

First, the silicon carbide was added to aqueous hydrochloric acid solution (30% by weight), and the mixture was stirred for 6 hours with heating. Next, the impurities dissolved in the acid solution was removed by washing with water and decantation. The washing and the decantation was repeated until the pH of the supernatant was 4.0. The silicon oxide was dried at 100° C. and pulverized to prepare the powder.

The washed silicon carbide was evaluated for its surface iron content by the procedure defined in JIS R6124. The results are shown in Table 1.

TABLE 1

| Silicon carbide | Surface iron content before washing | Surface iron content after washing |
|---|---|---|
| 10 μm | 0.22% | 0.01% |
| 4 μm | 0.45% | 0.02% |
| 1 μm | 0.70% | 0.04% |

Example 1

100 parts of dimethylpolysiloxane (having a degree of polymerization of 280) having both ends capped with dimethylvinylsiloxy groups, 1 part of a reinforcement silica filler (hydrophibicized fumed silica R-972 manufactured by Nippon Aerosil Co., Ltd.) having a specific surface area of 110 m²/g as measured by BET method, and 250 parts of washed silicon carbide having an average particle size of 4 μm and a surface iron content of 0.02% were placed in a planetary mixer, and the mixture was agitated for 30 minutes.

This mixture was kneaded by three rolls to disperse the filler, and the mixture was returned to the planetary mixer. After adding 2.1 parts of methylhydrogenpolysiloxane (degree of polymerization, 25; Si—H group content, 0.0070 mol/g) having Si—H groups at both ends and in the side chain, 0.05 part of ethynylcyclohexanol (a reaction controller), and 0.1 part of a platinum catalyst (Pt concentration, 1%), the mixture was agitated for 15 minutes to obtain silicone rubber composition (1).

By using this silicone rubber composition (1), cured silicone rubber samples were prepared by curing in a press at 120° C. for 10 minutes, and curing in an oven at 200° C. for 4 hours. The samples were evaluated for their hardness and compression set by the procedure defined in JIS K6249 and thermal conductivity meter was measured by a thermal conductivity meter QTM-3 (manufactured by Kyoto Electronics Manufacturing Co., Ltd.). The results are shown in Table 2. The cured rubber samples were also placed in an oven at 230° C. for 300 hours, and then evaluated for their hardness and compression set. The results are also shown in Table 2.

Next, in a PFA resin tube (diameter, 14 mm; length, 250 mm; thickness, 50 μm) having its interior surface coated with a primer for addition curable liquid silicone rubber (No. 101A/B manufactured by Shin-Etsu Chemical Co., Ltd.) was inserted and secured an aluminum shaft (diameter, 10 mm; length, 300 mm) having its surface coated with the same primer so that the shaft would be at a constant distance from the tube interior surface. After filling the silicone rubber composition (1) in the space between the tube and the shaft, the composition was cured by heating at 150° C. for 30 minutes, and post-cured at 200° C. for 4 hours to thereby produce a fixing roll comprising the aluminum shaft, a layer of the silicone rubber on the exterior of the aluminum shaft, and a layer of the fluororesin on the exterior of the silicone rubber layer. The silicone rubber layer had a thickness of 2.0 mm. This fixing roll was mounted on an electrophotographic copier, and no problem was noted for the image after making 10,000 copies on A4 copying papers.

Example 2

80 parts of dimethylpolysiloxane (degree of polymerization, 420; vinyl group content, 0.000072 mol/g) having both ends capped with trimethylsiloxy groups and having vinyl groups in the side chain, 20 parts of dimethylpolysiloxane (having a degree of polymerization of 250) having both ends capped with dimethylvinylsiloxy groups, 0.5 part of hydrophibicized fumed silica (R-972 manufactured by Nippon Aerosil Co., Ltd.) having a specific surface area of 110 m²/g as measured by BET method, 5 parts of siloxane compound represented by the following general formula (I):

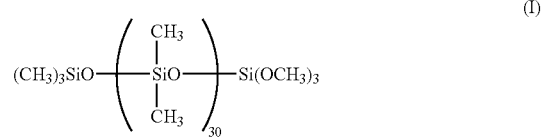

240 parts of washed silicon carbide having an average particle size of 10 μm and a surface iron content of 0.04%, 80 parts of parts of washed silicon carbide having an average particle size of 1 μm and a surface iron content of 0.04%, and 6 parts of iron oxide having an average particle size of 0.16 μm were placed in a planetary mixer, and the mixture was agitated for 1 hour at room temperature (23° C.). This mixture was kneaded by three rolls for the filler dispersion, and the mixture was returned to the planetary mixer. After adding 2.7 parts of methylhydrogenpolysiloxane (degree of polymerization, 38; Si—H group content, 0.0045 mol/g) having Si—H groups in the side chain, 0.05 part of ethynylcyclohexanol (a reaction controller), and 0.1 part of a platinum catalyst (Pt concentration, 1%), the mixture was agitated for 15 minutes to obtain silicone rubber composition (2). By using this silicone rubber composition (2), cured silicone rubber samples were prepared by curing in a press at 120° C. for 10 minutes, and curing in an oven at 200° C. for 4 hours. The samples were evaluated for their hardness and compression set, thermal conductivity, and the hardness and compression set after the heat resistance test by repeating the procedure of Example 1. The results are shown in Table 2.

Next, this silicone rubber composition (2) was coated by ring coating to a thickness of 0.4 mm on a polyimide resin thin film endless belt (width, 250 mm; circumference, 150 mm; thickness, 100 μm) which had been treated with the primer, and the composition was cured by heating to 150° C. for 30 minutes. The polyimide resin thin film belt having the silicone rubber coating was then inserted in a PFA tube (thickness, 25 μm) which had been treated with the primer, heated at 120° C. for 60 minutes, and post-cured in an oven at 200° C. for 4 hours to thereby prepare a fixing belt. This fixing belt was mounted on an electrophotographic copier, and no problem was noted for the image after making 10,000 copies on A4 copying papers.

Example 3

100 parts of raw rubber-like organopolysiloxane comprising 99.825% by mole of dimethylsiloxane unit, 0.15% by mole of methylvinylsiloxane unit, and 0.025% by mole of dimethylvinylsiloxane unit having an average degree of polymerization of about 5,000 was mixed with 5 parts of fumed silica (Aerosil 200 manufactured by Nippon Aerosil Co., Ltd.) having a specific surface area of 200 m$^2$/g as measured by BET method, and 10 parts of dimethylpolysiloxane (degree of polymerization 10) having hydroxy groups on both ends, and the mixture was homogeneously blended in a kneader followed by heat treatment at 150° C. for 2 hours to thereby produce a base compound. To 100 parts of this base compound were added 120 parts of washed silicon carbide having an average particle size of 10 μm and a surface iron content of 0.01%, 40 parts of pulverized quartz having an average particle size of 1.5 μm, and 3 parts of iron oxide having an average particle size of 0.10 μm by using two rolls, and to this mixture was further added 0.8 part of C-25A (platinum catalyst) and 2.0 parts of C-25B (organohydrogenpolysiloxane) (both manufactured by Shin-Etsu Chemical Co., Ltd.) as addition crosslinkable curing agents by using two rolls. Cured silicone rubber samples were prepared by curing in a press at 170° C. for 10 minutes, and curing in an oven at 200° C. for 4 hours. The samples were evaluated for their hardness and compression set, thermal conductivity, and the hardness and compression set after the heat resistance test by repeating the procedure of Example 1. The results are shown in Table 2.

Next, in a PFA resin tube (diameter, 13 mm; length, 250 mm; thickness, 50 μm) having its interior surface coated with a primer for addition curable liquid silicone rubber (No. 101A/B manufactured by Shin-Etsu Chemical Co., Ltd.) was inserted and secured an aluminum shaft (diameter, 10 mm; length, 300 mm) having its surface coated with the same primer so that the shaft would be at a constant distance from the tube interior surface. After filling the silicone rubber composition (3) in the space between the tube and the shaft, the composition was cured by heating at 150° C. for 30 minutes, and post-cured at 200° C. for 4 hours to thereby produce a fixing roll comprising the aluminum shaft, a layer of the silicone rubber on the exterior of the aluminum shaft, and a layer of the fluororesin on the exterior of the silicone rubber layer. The silicone rubber layer had a thickness of 1.5 mm. This fixing roll was mounted on an electrophotographic copier, and 10,000 copies were made on A4 copying papers. The image had no problem after making 10,000 copies.

Comparative Example 1

The production procedure of silicone rubber composition (1) in Example 1 was repeated except that the washed silicon carbide (surface iron content, 0.02%) having an average particle size of 4 μm was replaced with the same amount of unwashed silicon carbide (surface iron content 0.45%) having an average particle size of 4 μm to produce the silicone rubber composition (4). By using this silicone rubber composition (4), cured silicone rubber samples were prepared by curing in a press at 120° C. for 10 minutes, and curing in an oven at 200° C. for 4 hours. The samples were evaluated for their hardness and compression set, thermal conductivity, and the hardness and compression set after the heat resistance test by repeating the procedure of Example 1. The results are shown in Table 2.

By using the silicone rubber composition (4), a fixing roll was prepared by repeating the procedure of Example 1. This fixing roll was mounted on an electrophotographic copier, and copies were made on A4 copying papers. Some parts of the image became slightly unclear after making about 6,000 copies, and when the fixing roll that had been mounted on the copier was examined after making 10,000 copies, innumerable wrinkles were noted on the surface of the fixing roll.

Comparative Example 2

The production procedure of silicone rubber composition (2) in Example 2 was repeated except that the washed silicon carbide (surface iron content, 0.01%) having an average particle size of 10 μm was replaced with the same amount of unwashed silicon carbide (surface iron content 0.22%) having an average particle size of 10 μm and the washed silicon carbide (surface iron content, 0.04%) having an average particle size of 1 μm was replaced with the same amount of unwashed silicon carbide (surface iron content 0.70%) having an average particle size of 1 μm to produce the silicone rubber composition (5). By using this silicone rubber composition (5), cured silicone rubber samples were prepared by curing in a press at 120° C. for 10 minutes, and curing in an oven at 200° C. for 4 hours. The samples were evaluated for their hardness and compression set, thermal conductivity, and the hardness and compression set after the heat resistance test by repeating the procedure of Example 1. The results are shown in Table 2.

By using the silicone rubber composition (5), a fixing belt was prepared by repeating the procedure of Example 2. This fixing belt was mounted on an electrophotographic copier, and copies were made on A4 copying papers. The image became disturbed after making about 8,100 copies, and when the fixing belt that had been mounted on the copier was examined after making 10,000 copies, a stripe pattern was noted on the surface of the fixing belt.

Comparative Example 3

The production procedure of silicone rubber composition (3) in Example 3 was repeated except that the washed silicon carbide (surface iron content, 0.01%) having an average particle size of 10 μm was replaced with the same amount of unwashed silicon carbide (surface iron content 0.22%) having an average particle size of 10 μm to produce the silicone rubber composition (6). By using this silicone rubber composition (6), cured silicone rubber samples were prepared by curing in a press at 120° C. for 10 minutes, and curing in an oven at 200° C. for 4 hours. The samples were evaluated for their hardness and compression set, thermal conductivity, and the hardness and compression set after the heat resistance test by repeating the procedure of Example 1. The results are shown in Table 2.

By using the silicone rubber composition (6), a fixing roll was prepared by repeating the procedure of Example 3. This fixing roll was mounted on an electrophotographic copier, and copies were made on A4 copying papers. The image became disturbed after making about 3,800 copies, and when the fixing roll that had been mounted on the copier was examined after making 5,000 copies, surface irregularities were found on some parts of the roll surface.

TABLE 2

|  | Example | | | Comparative Example | | |
| --- | --- | --- | --- | --- | --- | --- |
|  | 1 | 2 | 3 | 1 | 2 | 3 |
| Hardness (durometer A) | 50 | 35 | 55 | 49 | 35 | 56 |
| Compression set (%) | 8 | 11 | 13 | 42 | 39 | 44 |
| Thermal conductivity (W/m · ° C.) | 0.91 | 1.25 | 0.65 | 0.90 | 1.24 | 0.65 |
| After maintaining at 230° C. for 300 hours | | | | | | |
| Hardness (durometer A) | 52 | 38 | 54 | 56 | 46 | 62 |
| Compression set (%) | 10 | 15 | 15 | 58 | 55 | 49 |

Japanese Patent Application No. 2009-158809 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A silicone rubber composition for forming a heat conductive thermal fixing roll or a heat conductive thermal fixing belt comprising
100 parts by weight of a heat-curable silicone rubber composition and
120 to 320 parts by weight of thermal conductivity-imparting components consisting of (i) silicon carbide having an iron content of 0.01 to 0.1% by weight at a surface of the silicon carbide and an average particle size of 4-20 μm and optionally (ii) one or more additional thermal conductivity-imparting components selected from the group consisting of silicon carbide having an iron content of up to 0.1% by weight at the surface of the silicon carbide and an average particle size of 1-20 μm other than the silicon carbide (i), and pulverized quartz having an average particle size of 1.5 μm, in an amount of 20 to 40 parts by weight,
wherein at least 75% by weight of the thermal conductivity-imparting components is the silicon carbide (i) in an amount of 120 to 250 parts by weight, and any remainder is the optional one or more additional thermal conductivity-imparting components (ii),
wherein the heat-curable silicone rubber composition is an addition curable silicone rubber composition which consists of:
(A) 100 parts by weight of an organopolysiloxane, having a degree of polymerization of 250 to 5,000, having at least two alkenyl groups bonded to the silicon atoms in one molecule,
(B) an organohydrogenpolysiloxane having at least two hydrogen atoms bonded to the silicon atoms in one molecule, in an amount such that the molar ratio of the hydrogen atoms bonded to the silicon atoms to the alkenyl groups in component (A) is in the range of 0.4 to 5,
(C) a catalytic amount of an addition catalyst, and
the silicone rubber composition is cured at 120 to 200° C. for 3 minutes to 1 hour.

2. The silicone rubber composition according to claim 1 wherein the silicon carbide is prepared by washing pulverized silicon carbide with an aqueous acid solution.

3. The silicone rubber composition according to claim 2 wherein the acid of the aqueous acid solution is selected from the group consisting of hydrochloric acid, sulfuric acid, nitric acid, and hydrofluoric acid.

4. The silicone rubber composition according to claim 1 wherein the silicon carbide is a mixture of particles having an average particle size of at least 5 μm and particles having an average particle size of less than 5 μm at a weight ratio of 99/1 to 50/50.

5. The silicone rubber composition according to claim 1 further comprising
iron oxide having an average particle size of 0.01 to 0.5 μm in an amount of 0.1 to 20 parts by weight per 100 parts by weight of the heat-curable silicone rubber composition.

6. The silicone rubber composition according to claim 1 wherein the cured silicone rubber has a thermal conductivity of at least 0.5 W/m·° C.

7. A fixing roll comprising a mandrel and a silicone rubber layer on a outer surface of the mandrel wherein the silicone rubber layer is a cured product of the thermal fixing roll or belt-forming silicone rubber composition of claim 1.

8. A fluororesin-coated fixing roll comprising a mandrel, a silicone rubber layer on a outer surface of the mandrel, and a fluororesin layer on the silicone rubber layer, wherein the silicone rubber layer is a cured product of the thermal fixing roll or belt-forming silicone rubber composition of claim 1.

9. A fixing belt comprising a substrate comprising a heat resistant resin or a metal and silicone rubber layers on front and back surfaces of the substrate, wherein the silicone rubber layers are a cured product of the thermal fixing roll or belt-forming silicone rubber composition of claim 1.

10. A fluororesin coated fixing belt comprising a substrate comprising a heat resistant resin or a metal, silicone rubber layers on front and back surfaces of the substrate, and fluororesin layers on the silicone rubber layers, wherein the silicone rubber layer is a cured product of the thermal fixing roll or belt-forming silicone rubber composition of claim 1.

11. The silicone rubber composition according to claim 1 wherein the silicone rubber composition is further post-cured at 180 to 220° C. for 1 to 12 hours.

12. A silicone rubber composition for forming a heat conductive thermal fixing roll or a heat conductive thermal fixing belt comprising
100 parts by weight of a heat-curable silicone rubber composition and
120 to 320 parts by weight of thermal conductivity-imparting components consisting of (i) silicon carbide having an iron content of 0.01 to 0.1% by weight at a surface of the silicon carbide and an average particle size of 4-20 μm and optionally (ii) an additional thermal conductivity-imparting component which is pulverized quartz having an average particle size of 1.5 μm, in an amount of 20 to 40 parts by weight, wherein at least 75% by weight of the thermal conductivity-imparting components is the silicon carbide (i) in an amount of 120 to 250 parts by weight, and any remainder is the optional thermal conductivity-imparting component (ii), wherein the heat-curable silicone rubber composition is an addition curable silicone rubber composition which consists of:

(A) 100 parts by weight of an organopolysiloxane, having a degree of polymerization of 250 to 5,000, having at least two alkenyl groups bonded to the silicon atoms in one molecule, (B) an organohydrogenpolysiloxane having at least two hydrogen atoms bonded to the silicon atoms in one molecule, in an amount such that the molar ratio of the hydrogen atoms bonded to the silicon atoms to the alkenyl groups in component (A) is in the range of 0.4 to 5, (C) a catalytic amount of an addition catalyst, and the silicone rubber composition is cured at 120 to 200° C. for 3 minutes to 1 hour.

* * * * *